United States Patent [19]

Stapleton

[11] Patent Number: 4,864,708

[45] Date of Patent: Sep. 12, 1989

[54] HYDRAULIC VALVE LIFTER REMOVAL DEVICE

[76] Inventor: Aubrey G. Stapleton, Rte. 2, Box 604, Pennington Gap, Va. 24277

[21] Appl. No.: 190,840

[22] Filed: May 6, 1988

[51] Int. Cl.[4] .......... B23P 19/04

[52] U.S. Cl. .......... 29/213.1; 29/270; 29/275

[58] Field of Search .......... 211/69.5, 74, 70.6, 211/60.1; 29/280, 278, 270, 275, 254, 255, 213 R, 213 E, 214, 215

[56] References Cited

U.S. PATENT DOCUMENTS

| | | | |
|---|---|---|---|
| 1,138,753 | 5/1915 | Gussner et al. | 211/74 |
| 2,592,189 | 4/1952 | Rothrock | 211/74 |
| 3,979,811 | 9/1976 | Kammeraad | 29/215 |
| 4,292,719 | 10/1981 | Britton | 29/280 |

*Primary Examiner*—Robert C. Watson

*Attorney, Agent, or Firm*—Pitts and Brittian

[57] ABSTRACT

A hydraulic valve lifter removal device (10) for removing hydraulic valve lifters from an engine (14). The removal device (10) comprises an elongated lifter retrieval housing (24) having a closed distal end portion (26) for being inserted through the cam shaft opening (34) of an engine (14) and into the interior of the engine. The housing (24) also includes a proximal end portion (28) which remains exterior to the engine for manipulating the housing (24). A plurality of lifter receiving openings (32) accessing the interior of the housing (24) are selectively spaced along the length of the housing (24). The lifter receiving openings (32) are selectively spaced along the length of the housing (24) such that upon selective positioning of the housing (24) at least a plurality of the openings (32) register with a plurality of lifter receptors (16) within the engine (14) so as to be receptive of the associated hydraulic valve lifters (12) as they are dislodged from the receptors (16), thereby allowing the lifters (12) to be retrieved from the interior of the engine (14).

13 Claims, 3 Drawing Sheets

HYDRAULIC VALVE LIFTER REMOVAL DEVICE

TECHNICAL FIELD

This invention relates to devices for working on an internal combustion engine, and more particularly to a tool designed to facilitate the removal of hydraulic valve lifters from such an engine. In this particular invention, the device comprises an elongating lifter receiving housing provided with a plurality of lifter receiving openings.

BACKGROUND ART

Conventional internal combustion engines generally include a plurality of hydraulic valve lifters which are positioned in receptors within the engine. The valve lifters facilitate the opening and closing of the valve associated with the various cylinders of the engine, and are positioned between, and engage, the push rods and the various cams of the cam shaft of the engine. Should inspection or replacement of a lifter be required, the lifter must be dislodged from its receptor and retrieved from the interior of the engine, and, heretofore, in order to accomplish the removal of the lifters, substantial portions of the engine had to be disassembled to gain access to the lifter. In order to avoid disassembly of the engine, various tools and devices have been constructed to facilitate the removal of the lifters. One such tool is disclosed in U.S. Pat. No. 4,292,719, However, such tools tend to be difficult to use and, whereas certain tools avoid extensive disassembly of the engine, they do little to simplify removal of the lifter.

Therefore, it is an object of the present invention to provide a hydraulic valve lifter removal device for removing valve lifters from an engine.

It is a further object of the present invention to provide a hydraulic valve lifter removal device which does not require extensive disassembly of the engine to accomplish the removal.

Yet another object of the present invention is to provide a hydraulic valve lifter removal device which both dislodges the lifters from their associated recesses and retrieves the dislodged lifters from the interior of the engine.

A further object of the present invention is to provide a hydraulic valve lifter removal device which is inexpensive to manufacture and maintain.

DISCLOSURE OF THE INVENTION

Other objects and advantages will be accomplished by the present invention which provides a hydraulic valve lifter removal device for facilitating the removal of hydraulic valve lifters from an engine. The lifter removal device comprises an elongated lifter retrieval housing having a closed distal end portion for being inserted through the cam shaft opening of an engine, whereby a selective portion of the housing is received within the engine in close proximity to the lifter receptors which hold the hydraulic lifters of the engine. The housing further includes a proximal end portion which remains exterior to the engine for manipulating the housing. A plurality of lifter receiving openings accessing the interior cavity of the housing are selectively spaced along the length of the housing. The lifter receiving openings are selectively spaced along the length of the housing such that upon selective positioning of the housing within the engine at least a plurality of the openings register with a plurality of lifter receptors so as to be receptive of the associated lifters as they are dislodged from the receptors, thereby allowing the lifters to be retrieved from the interior of the engine. Further, in the preferred embodiment, the device is provided with first and second lifter engaging rods for dislodging the lifters from their receptors.

BRIEF DESCRIPTION OF THE DRAWINGS

The above-referenced features of the invention will be more clearly understood from the following detailed description of the invention read together with the drawings in which.

BEST MODE FOR CARRYING OUT THE INVENTION

Figure 5:
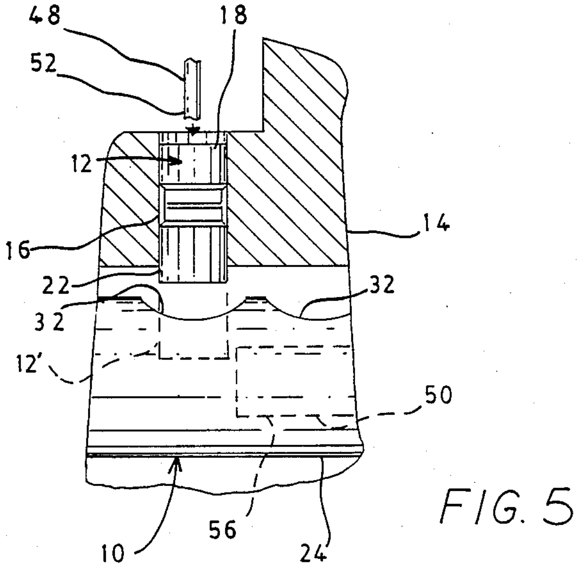
FIG. 5 illustrates a partial side elevation view, in section of an engine, and a partial side elevation view of a hydraulic valve lifter removal device of the present invention.

A hydraulic valve lifter removal device incorporating various features of the present invention is illustrated generally at 10 in the figures. The removal device 10 is designed to facilitate the removal of hydraulic valve lifters 12 from an internal combustion engine, such as the engine 14 diagrammatically illustrated in FIG. 1. In this regard, as illustrated in FIG. 5, each lifter 12 is slidably received in an associated receptor 16 provided in the engine 14 such that the upper end portion 18 of the lifter 12 engages an operatively associated push rod 20 (See FIG. 1), and the lower end portion 22 of the lifter 12 engages a cam (not shown) mounted on the cam shaft (not shown) of the engine 14. Thus, in order to examine or replace a lifter, the lifter 12 must be dislodged from its receptor 16 and retrieved from interior of the engine 14.

Figure 3:
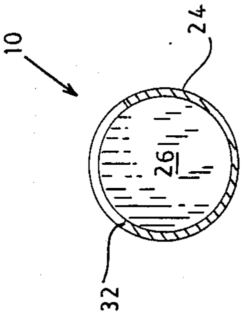
FIG. 3 illustrates an end view, in section, of a hydraulic valve lifter removal device of the present invention.
Figure 2:
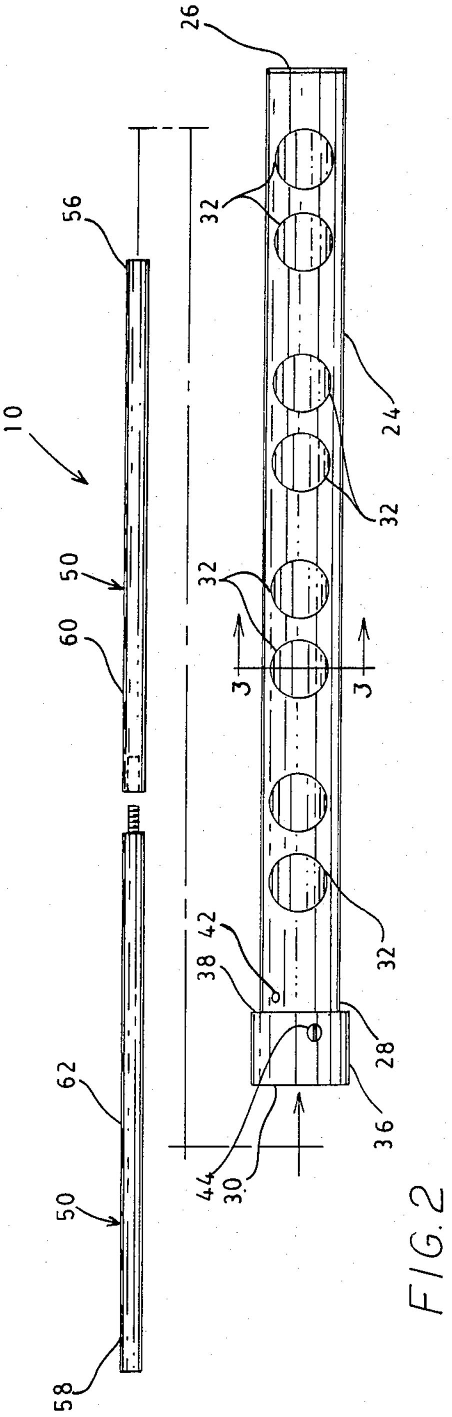
FIG. 2 illustrates an exploded side elevation view of hydraulic valve lifter removal device of the present invention.

As best illustrated in FIGS. 2 and 3, the removal device 10 comprises an elongated lifter retrieval housing which, in the preferred embodiment, defines the illustrated tubular housing 24. The housing 24 has a closed distal end portion 26, and has a proximal end portion 28 which defines an opening 30 accessing the interior of the tubular housing 24. It will, however, be recognized from the discussion which follows that the tubular housing 24, with its circular cross-section (See FIG. 3), is simply the preferred configuration, and retrieval housings defining other cross-sectional configurations can be used if desired.

The tubular housing 24 is provided with a plurality of lifter receiving openings 32 selectively spaced along the length of the housing 24, the openings 32 communicating with the interior of the housing 24. The openings 32 are designed to receive the lifters 12 as they are dislodged from their associated receptors 16 and, accordingly, the spacing of the openings 32 is such that, upon the selected positioning of the housing 24 within the engine 14, at least a selected number of openings 32 register with the receptors 16. In this regard, when using the device 10, the cam shaft of the engine 14 is removed, and the housing 24 is inserted into the cam saft opening 34 provided in the front of the engine 14 and positioned within the engine such that all, or a portion of the openings 32 register with the receptors 16 in which the lifters 12 are seated (See FIG. 1). Thus, the openings 32 are positioned to receive the lifters 12 as they are dislodged from their receptors 16.

Figure 4:
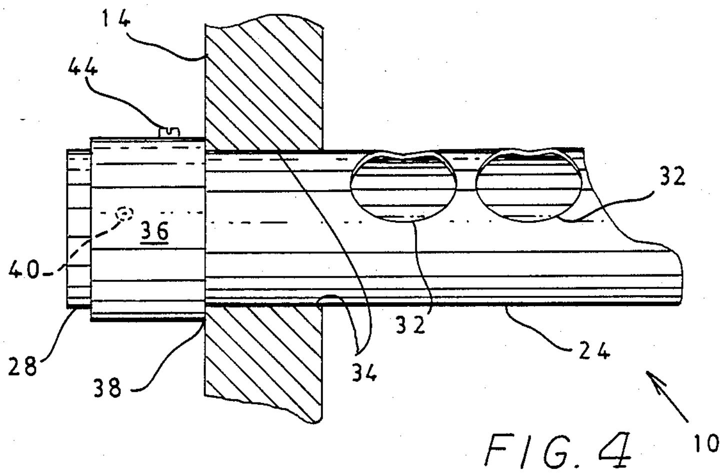
FIG. 4 illustrates a partial side elevation view of a hydraulic valve lifter removal device of the present invention.

It will be appreciated that the users view of the housing 24 is obscured once the housing 24 is inserted into the engine interior. Therefore, the device 10 also includes insertion depth determining means for facilitating the axial positioning of the housing 24, and radial position indicating means for facilitating the positioning of the openings 32 such that they are substantially coaxially aligned with the receptors 16. In the preferred embodiment, the insertion depth determination means comprises a stop member or collar 36 which is slidably received about the proximal end portion 28 of the housing 24. The collar 36 defines a forward edge 38 which engages the exterior of the engine 14 adjacent the aperture 34 such that the collar 36 serves as a stop to prohibit further insertion of the housing 14 into the interior of the engine (See FIG. 4). Of course, the collar 36 is selectively positioned such that upon engaging the exterior surface of the engine 14, the desired axial position of the housing 24 is achieved.

Figure 1:
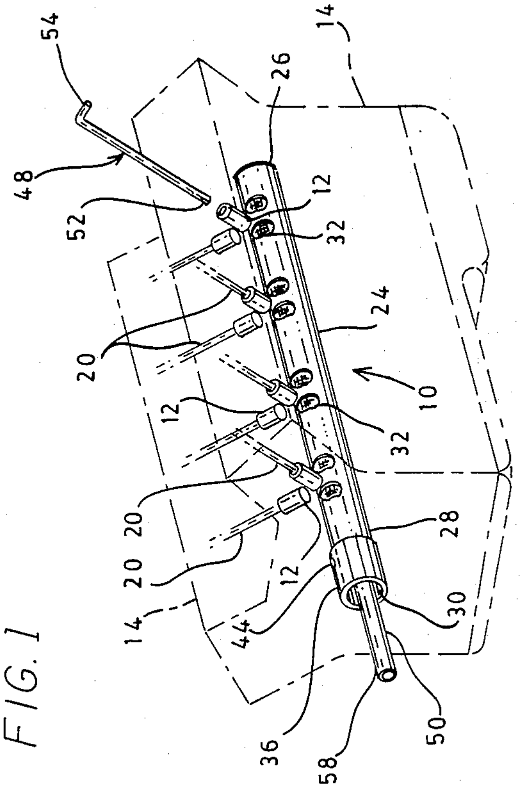
FIG. 1 illustrates a perspective view of a hydraulic valve lifter removal device of the present invention diagrammatically depicted as positioned within an engine.

Whereas, for many applications a single insertion depth may be sufficient to accomplish removal of the various lifters, certain engine configurations will require more than one depth setting to accomplish removal of the various lifters 12. For example, as illustrated in FIG. 1, engines with "V" cylinder configurations may require a first depth setting for removal of the lifters 12 associated with the cylinders disposed on the right side of the engine and a second depth setting for removal of the lifters 12 associated with the cylinders on the left side of the engine 14. Therefore, in the preferred embodiment, the collar 36 is releasably secured to the housing 24 such that the insertion depth setting can be altered. More specifically, in the preferred embodiment, first and second axially spaced holes 40 and 42 are provided in the proximal end portion 28 of the housing 24, and a screw 44, or other fastener, is releasably received through a hole 46 in the collar 36 and selectively received in either the hole 40 or 42 depending on the depth setting desired.

It will be recognized that the collar 36 is simply one preferred insertion depth determining means. Such means can comprise various stop members, or can comprise one or more lines or other indicia etched into, or provided on, the exterior of the proximal end portion to indicate the desired depth of insertion.

Figure 6:
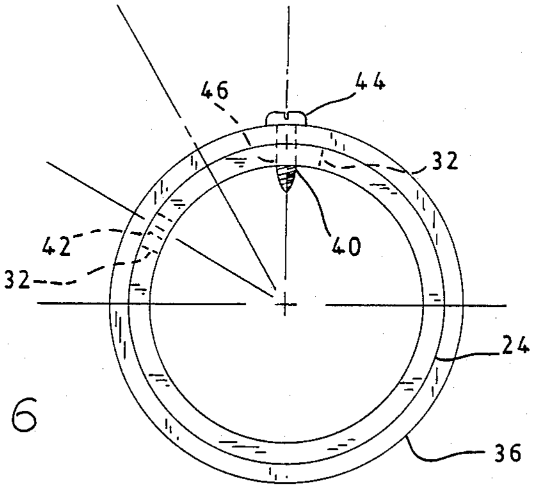
FIG. 6 illustrates an end view of a hydraulic valve lifter removal device of the present invention.
Figure 7:
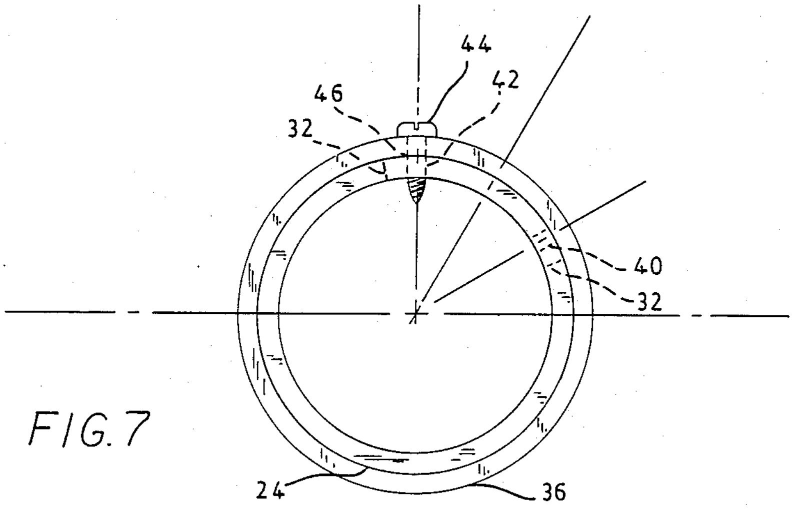
FIG. 7 illustrates an end view of a hydraulic valve lifter removal device of the present invention.

As indicated above, even after the proper axial positioning of the housing 24 is achieved, the openings 32 must be radially positioned such that the openings 32 register with the receptors 16, and radial position indicating means are provided to accomplish proper positioning of the openings 32. In the preferred embodiment of the device 10, the screw 44 serves as the radial position indicating means, such that when the housing 24 is positioned with the screw 44 in the 12 O'clock position illustrated in FIG. 6 and 7, the proper radial position of the openings 32 is achieved. More specifically, the first hole 40 is positioned, relative to the position of the openings 32, such that as the screw 44 is received in the hole 40 and placed in the 12 O'clock position as indicated in FIG. 6, the openings 32 are positioned so as to register with the receptors 16 operatively associated with the left side of the engine 14. And, the second hole 42 is positioned, relative to the position of the openings 32, such that as the screw 44 is received in the hole 42 and placed in the 12 O'clock position, as illustrated in FIG. 7, the openings 32 are positioned so as to register with the receptors 16 operatively associated with the right side of the engine. It will, however, be noted that other radial position indicating means can be utilized if desired, as for example, a line, or other indicia etched into, or provided on, the collar 36, or the proximal end portion 28 of the housing 24.

In order to accomplish the dislodging of the lifters 12 such that they can be received by the housing 24, the preferred embodiment of the device 10 is provided with a first lifter dislodging rod 48 and a second lifter dislodging rod 50. The first lifter dislodging rod 48 has a first end portion 52 for engaging the upper end portion 18 of a lifter and a second end portion which, in the preferred embodiment, defines a handle 54. The second dislodging rod defines a first end portion 56 for engaging the lower end portion 22 of a lifter and a second end portion 58 for being grasped by the user. When utilizing the rods 48 and 50 to dislodge a lifter 12, the associated push rod 20 is removed and the first rod 48 is inserted into the push rod opening. The first end portion 52 of the rod 48 is brought into contact with the upper end portion 18 of the lifter 12 (See FIG. 5), and downward force is applied to the rod 48, forcing the lifter downward in the receptor 16. When such downward force ceases to produce downward motion of the lifter, the lower end portion 24 of the lifter 12 will have been received through the opening 32 of the housing 24 as illustrated at 12' in FIG. 5. The second rod 50 is then inserted into the housing 24 through the opening 30, and the first end portion 56 of the rod is used to tap the lifter 12, while downward force on the lifter 12 is applied with the rod 48, thereby dislodging the lifter 12 and allowing it to drop into the housing 24. This process is repeated with each lifter 12 to be removed, and, when all lifters 12 have been dislodged, the lifters can be retrieved by removing the housing 24 from the engine 14.

Referring now to FIG. 2, it will be noted that in the preferred embodiment, the second rod 50 defines a first rod portion 60 and a second rod portion 62 which are threadably, or otherwise releasably joined, the portions 60 and 62 being substantially equal in length. In this regard, although the rod 50 can be integrally formed, the manipulation of an integrally formed rod 50 can be obstructed by the grill or other components of certain vehicles, particularly during removal of the lifters mounted in the forward portion of the engine since much of the length of the rod 50 is exterior to the housing 24. By providing for the releasable joining of the portions 60 and 62, the length of the rod 50 can be varied and obstruction of the rod 50 can be avoided. For example, the first rod portion 60, without the second portion 62 attached, can be used to engage the lifters mounted in the forward portion of the engine, and the second rod portion 62 can then be joined with the first portion such that the lifters mounted in the rear portion of the engine can be reached In light of the above, it will be recognized that the present invention provides a hydraulic lifter removal device with many advantages over the prior art. In this regard, the device 10 provides means for not only dislodging the lifters from their associated receptors, but provides means for quickly and efficiently retrieving the lifters from the engine interior. Moreover, the device 10 allows removal of valve lifters without extensive disassembly of an engine. While a preferred embodiment has been shown and described, it will be understood that there is no intent to limit the invention to such disclosure, but rather, it is intended to cover all modifications and alternate constructions of the invention as defined in the appended claims.

I claim:

1. A hydraulic valve lifter removal device for facilitating the removal of hydraulic valve lifters from an engine, said engine being provided with a cam shaft opening accessing the interior of said engine, and a plurality of receptors for receiving said hydraulic valve lifters, each said lifter having an upper end portion and a lower end portion, said hydraulic valve lifter removal device comprising:

an elongated lifter retrieval housing defining an interior cavity, said housing having a closed distal end portion for being inserted through said cam shaft opening whereby at least a selected portion of said housing is positioned within said interior of said engine, and having a proximal end portion defining an opening accessing said internal cavity of said housing, said housing being provided with a plurality of lifter receiving openings communicating with said internal cavity of said housing, said lifter receiving openings being selectively spaced along the length of said housing whereby, upon selective positioning of said housing within said engine, at least a plurality of said lifter receiving openings register with a plurality of said receptors so as to be receptive of said lifters as said lifters are dislodged from said receptors.

2. The hydraulic valve lifter removal device of claim 1 wherein said housing is provided with insertion depth determining means for determining the appropriate depth of insertion of said housing into said cam shaft opening to accomplish the positioning of said housing whereby at least a plurality of said lifter receiving openings register with a plurality of said receptors of said engine.

3. The hydraulic valve lifter removal device of claim 1 wherein said housing is provided with insertion depth determining means for determining the appropriate depth of insertion of said housing into said cam shaft opening to accomplish the positioning of said housing whereby at least a plurality of said lifter receiving openings register with a plurality of said receptors of said engine.

4. The hydraulic valve lifter removal device of claim 3 wherein said insertion depth determining means comprises a collar received about said proximal end portion of said housing at a preselected location, said collar defining a forward edge for engaging said engine adjacent said cam shaft opening whereby said further insertion of said housing into said engine is prohibited.

5. The hydraulic valve lifter removal device of claim 1 wherein said proximal end portion of said housing is provided with radial position indicating means for facilitating the radial positioning of at least a plurality of said lifter receiving openings to register with said lifter receptors of said engine.

6. The hydraulic valve lifter removal device of claim 4 wherein said proximal end portion of said housing is provided with radial position indicating means for facilitating the radial positioning of at least a plurality of said lifter receiving openings to register with said lifter receptors of said engine.

7. The hydraulic valve lifter removal device of claim 1 wherein said device further comprises an elongated lifter engaging rod having a first end portion for engaging said upper end portions of said lifters whereby downward force is exerted on said rod to facilitate the dislodging of said lifters from their associated receptors.

8. The hydraulic valve lifter removal device of claim 7 wherein said device further includes a further elongated lifter engaging rod having a first end portion for engaging said lifters and a second end portion for manipulating said further rod, whereby said further rod is selectively inserted into said further opening in said housing and into said internal cavity for striking said lower end portions of said lifters so as to dislodge said lifters from their associated receptors.

9. The hydraulic valve lifter removal device of claim 7 wherein said device further includes a further elongated lifter engaging rod having a first end portion for engaging said lifters and a second end portion for manipulating said further rod, whereby said further rod is selectively inserted into said further opening in said housing and into said internal cavity for striking said lower end portions of said lifters so as to dislodge said lifters from their associated receptors.

10. A hydraulic valve lifter removal device for facilitating the removal of hydraulic lifters from an engine, said engine being provided with a cam shaft opening accessing the interior of said engine, and a plurality of receptors for receiving said hydraulic valve lifters, each said lifter having an upper end portion and a lower end portion, said hydraulic valve lifter removal device comprising:

an elongated lifter retrieval housing defining an interior cavity, said housing having a closed distal end portion for being inserted through said cam shaft opening whereby at least a selected portion of said housing is positioned within said interior of said engine, said housing being provided with a plurality of lifter receiving openings communicating with said internal cavity of said housing, said lifter receiving openings being selectively spaced along the length of said housing whereby, upon selective positioning of said housing within said engine, at least a plurality of said lifter receiving openings register with a plurality of said receptors so as to be receptive of said lifters as said lifters are dislodged from said receptors, said housing having a proximal end portion provided with an axially disposed opening;

insertion depth determining means for determining the appropriate depth of insertion of said housing into said cam shaft opening to accomplish the positioning of said housing whereby at least a plurality of said lifter receiving openings register with a plurality of said receptors of said engine, said depth determining means including a collar received about said proximal end portion of said housing at a first preselected axial location, said collar defining a forward edge for engaging said engine adjacent said cam shaft opening whereby said further insertion of said housing into said engine is prohibited;

radial position indicating means for facilitating the radial positioning of at least a plurality of said lifter receiving openings to register with said lifter receptors of said engine;

a first elongated lifter engaging rod having a first end portion for engaging said upper end portions of said lifters and applying downward force on said lifters to facilitate dislodging said lifters from their associated receptors; and a second lifter engaging rod having a first end portion for engaging said lifter and a second end portion for manipulating said second rod, whereby said second rod is selectively inserted into said further opening of said housing and into said internal cavity for striking said lower end portions of said lifters so as to dislodge said lifters from their associated receptors.

11. The hydraulic valve lifter removal device of claim 10 wherein said collar is slidably received by said proximal end portion of said housing and defines a hole, and wherein said radial positioning means comprises a screw for being releasably received in said hole in said collar and a first hole in said proximal end portion of said housing, said first hole in said housing being selectively located at a first radial position such that when said screw is received in said first hole and said screw is selectively positioned with respect to said engine, said housing assumes a first radial position whereby at least a plurality of said lifter receiving openings register with said lifter receptors, said first hole in said housing being located at a first axial position such that as said screw is received in said hole in said collar and said first hole in said housing, said collar is releasably secured to said housing at said first preselected axial location.

12. The hydraulic valve lifter removal device of claim 11 wherein said proximal end portion of said housing is provided with a second hole whereby, as said screw is received in said hole in said collar and in said second hole, and said screw is selectively positioned with respect to said engine with said forward edge of said collar engaging said engine, said housing assumes a second radial position and a second axial position whereby at least a plurality of said lifter receiving openings register with a plurality of other said lifter receptors.

13. The hydraulic valve lifter removal device of claim 11 wherein said second lifter engaging rod includes first and second releasably joined rod portions.

* * * * *